March 2, 1948.  M. L. WILLIAMS  2,437,059
GROUND WORKING IMPLEMENT
Filed May 7, 1945
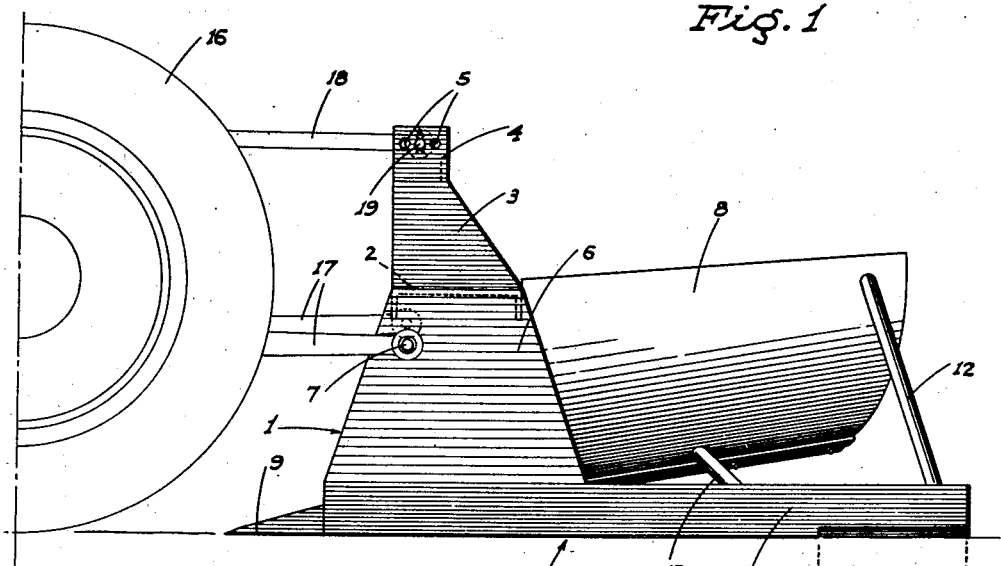
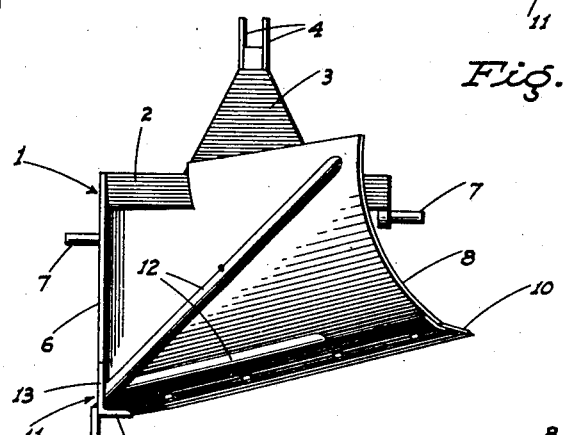
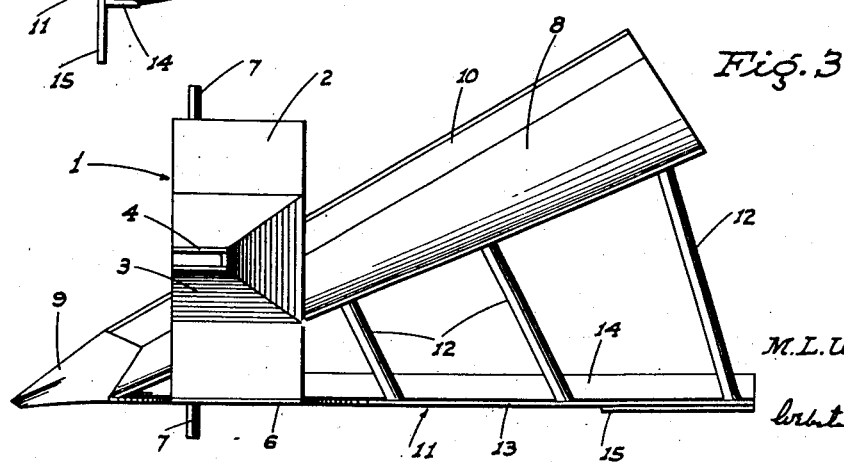
INVENTOR
M. L. Williams
ATTORNEYS Patented Mar. 2, 1948

2,437,059

UNITED STATES PATENT OFFICE 2,437,059

GROUND WORKING IMPLEMENT

Marvin L. Williams, Tulare, Calif.

Application May 7, 1945, Serial No. 592,485

2 Claims. (Cl. 37—98)

This invention relates generally to a ground working implement for agricultural purposes.

In particular the invention is directed to, and it is an object to provide, a novel tractor-drawn implement which is especially useful for making ditches for field irrigation, and for terracing in rolling hills.

Another object of the present invention is to provide a ditching and terracing implement which is constructed so that it is readily adaptable for connection to any tractor which includes a hitch having transversely spaced, power elevated draft links and a compression link thereabove as, for example, on the "Ford-Ferguson" tractor and others. As connected to the tractor, the implement is movable between a raised transport position above the ground, and a lowered ground working position.

A further object of the invention is to provide an implement of the type described which is of relatively high capacity, i. e. will turn a substantial quantity of soil with each pass; the implement structure being arranged, however, to minimize side draft resultant from the share and moldboard assembly which the implement includes.

It is also an object of the invention to provide a ditching and terracing implement which comprises a frame structure adapted for connection to the hitch of a tractor, a share and moldboard assembly mounted in rigid connection with the frame and extending diagonally relative to the direction of travel, an elongated landside mounted in rigid, unitary relation to said frame and assembly and extending longitudinally and rearwardly in ground engagement from the forward end of said assembly, and a ground penetrating fin on and dependent from the landside at the rear.

A further object of the invention is to provide a simple and inexpensive device embodying no moving parts, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 1 is a side elevation of the implement in use.

Figure 2 is a rear end view of the implement, detached from the tractor.

Figure 3 is a top plan view of the implement, detached from the tractor.

Referring now more particularly to the characters of reference on the drawings, the implement comprises a supporting frame, indicated generally at 1, and which frame includes a heavy-duty cross beam 2, here shown of inverted channel shape. On top and centrally of its ends the cross beam 2 is fitted with a rigid upstanding post 3 of generally pyramidal form, said post including, at its upper ends, a pair of transversely spaced attachment ears 4 of substantial height, said ears having matching horizontal rows of holes 5 for the purpose hereinafter described. At one end the cross beam 2 is rigidly secured to a vertical depending side plate 6 of heavy-duty gauge, said side plate facing laterally and increasing somewhat in width from top to bottom.

The above described frame structure is provided on opposite sides with laterally projecting trunnions 7 disposed in vertically offset relation, but in the same plane transversely of the implement.

An elongated moldboard 8 is secured at its leading end to the forward edge of the side plate 6 in symmetrical relation, the moldboard being rearwardly and laterally diagonaled with a sufficient back tilt toward the upper edge thereof to assure that the dirt moves freely along the moldboard and makes a uniform deposit of dirt at the outer end thereof to form, for example, a ditch bank. In addition to the above position of the moldboard it extends at a slight upward incline from its forward end.

At said forward end of the moldboard 8 it is fitted with a plow share 9 whose configuration is such as to feed directly onto said moldboard. As is evident from Fig. 3 of the drawings the moldboard 8 intersects the longitudinal center line of draft, with the forward end portion of the moldboard and the connected plow share on one side of said line, and with the rear end portion of said moldboard on the opposite side of the line. The moldboard is fitted, along its bottom edge and for substantially the full length thereof, with a weed cutter blade 10.

An elongated, longitudinally extending landside, indicated generally at 11, is fixed in connection with the plow share and lower edge of the side plate 6, and extends rearwardly to one side of but parallel to said longitudinal center line of draft.

The landside 11 extends rearwardly to a termination in a transverse plane slightly to the rear of the transverse plane of the rear end of the moldboard 8; said landside and moldboard being connected in rigid unitary relation by tubular bracing 12 which extends therebetween.

The landside 11 includes a vertically upstanding side plate 13 and a bottom plate 14, the latter riding directly on the ground. At its rear end the landside 11 is fitted with a rigid depending fin or "fish tail" 15 which extends lengthwise of the direction of travel and normally penetrates into the ground when the implement is in use, and at which time said landside rides atop said ground.

The implement is adapted to be connected with a tractor in draft relation, as follows:

The tractor, indicated generally at 16, includes a pair of transversely spaced, rearwardly projecting draft links 17 which are coupled at their rear ends to corresponding ones of the trunnions 7; said draft links being connected on the tractor with power lift means (not shown) whereby said links can be raised or lowered by power. The tractor also includes, above and centrally between the draft links 17, a compression link 18 which extends rearwardly and projects between the ears 4, being connected to the latter at longitudinally adjustable points by a cross pin 19 engaged through matching ones of the holes 5.

With advance of the implement the plow share 9 digs a furrow, and from which furrow soil is then discharged laterally of the direction of travel by the moldboard 8, forming a longitudinal bank beyond said moldboard. It will thus be evident that the implement is very useful in connection with the formation of irrigation ditches or the terracing of land in rolling hills. The depth of penetration of the plow share 9 is regulated by the adjusted position of connection of compression link 18 with the ears 4, said compression link tending to maintain the plow share 9 well within the ground.

The side draft of the implement is effectively compensated for by means of the landside 11 and its fin 15, together with the side plate 6. In addition, the vertical offsetting of the trunnions 7 makes possible a relative vertical adjustment of the draft links 17 such that side draft is further minimized; said draft links being relatively vertically adjustable, although capable of simultaneous power actuation.

When the implement is not in use, it may be raised to a transport position by power elevation of the links 17 and 18, which lifts the implement clear of the ground.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described the invention, the following is claimed as new and useful and upon which Letters Patent is desired:

1. A ground working implement comprising a cross beam, a downwardly projecting vertically disposed plate at one end of the cross beam, a longitudinally disposed landside fixed to the lower edge of the plate and projecting rearwardly therefrom, a mold board fixed to the forward edge of the plate and projecting rearwardly and diagonally therefrom, a plow share fixed to the forward end of the mold board, a trunnion projecting outwardly from the plate and the opposite end of the cross beam respectively and adapted to be connected to draft links, an upstanding post disposed centrally of the cross beam, and means at the upper end of the post for connecting it to a compression link.

2. A structure as in claim 1 in which the trunnions lie in the same plane transversely of the implement but in vertically offset relation.

MARVIN L. WILLIAMS.

REFERENCES CITED

The following references are of record in the file of this patent:

UNITED STATES PATENTS

| Number | Name | Date |
|---|---|---|
| 61,762 | Richards et al. | Feb. 5, 1867 |
| 62,766 | Matteson et al. | Mar. 12, 1867 |
| 389,750 | King | Sept. 18, 1888 |
| 936,345 | Newton | Oct. 12, 1909 |
| 1,068,922 | North | July 29, 1913 |
| 1,116,826 | Knight | Nov. 10, 1914 |
| 2,171,031 | Graham | Aug. 29, 1939 |
| 2,356,231 | Ferguson | Aug. 22, 1944 |
| 2,280,681 | Altgelt | Apr. 21, 1942 |
| 2,320,141 | Kott | May 25, 1943 |